(12) United States Patent
Asif Bashir et al.

(10) Patent No.: US 12,444,434 B2
(45) Date of Patent: Oct. 14, 2025

(54) MAGNETIC RECORDING HEAD WITH CURRENT PATH BETWEEN TRAILING SHIELD AND LEADING SHIELD FOR IMPROVED RESISTANCE

(71) Applicant: Western Digital Technologies, Inc., San Jose, CA (US)

(72) Inventors: Muhammad Asif Bashir, San Jose, CA (US); Alexander Goncharov, Morgan Hill, CA (US); Zhigang Bai, San Jose, CA (US); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/355,133

(22) Filed: Jul. 19, 2023

(65) Prior Publication Data

US 2024/0355353 A1    Oct. 24, 2024

Related U.S. Application Data

(60) Provisional application No. 63/496,770, filed on Apr. 18, 2023.

(51) Int. Cl.
*G11B 5/31*       (2006.01)
*G11B 5/127*      (2006.01)
(Continued)

(52) U.S. Cl.
CPC .......... *G11B 5/3116* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS 7,212,367 B2    5/2007   Clinton et
8,031,433 B2    10/2011  Yan et al.
(Continued)

OTHER PUBLICATIONS

Guan, Lijie et al., "A Trailing Shield Perpendicular Writer Design With Tapered Write Gap for High Density Recording", IEEE Transactions on Magnetics, Dec. 2008, <https://www.researchgate.net/publication/224360446_A_Trailing_Shield_Perpendicular_Writer_Design_With_Tapered_Write_Gap_for_High_Density_Recording>, Abstract Only.
(Continued)

*Primary Examiner* — Craig A. Renner
(74) *Attorney, Agent, or Firm* — Patterson + Sheridan, LLP

(57) ABSTRACT

The present disclosure generally relates to a magnetic recording head for magnetic media, such as a magnetic media drive. The head has a main pole, trailing shield, leading shield, first side shield, and second side shield. One side shield is electrically connected to the trailing shield and electrically disconnected from the leading shield. The other side shield is electrically connected to the leading shield and electrically disconnected from the trailing shield. The side shields are electrically connected through a hot seed layer and/or a nonmagnetic electrically conductive layer that is electrically disconnected from the main pole. Such an arrangement results in a current path from the trailing shield, through the side shields, around the main pole, and to the leading shield, which results in reduced resistance.

18 Claims, 10 Drawing Sheets

(51) Int. Cl.
  *G11B 5/235* (2006.01)
  *G11B 5/00* (2006.01)
(52) U.S. Cl.
  CPC ............ *G11B 5/314* (2013.01); *G11B 5/3143* (2013.01); *G11B 5/315* (2013.01); *G11B 2005/0024* (2013.01)

(56) References Cited

U.S. PATENT DOCUMENTS

| | | | |
|---|---|---|---|
| 8,411,390 B2 | 4/2013 | Franca-Neto et al. | |
| 8,724,259 B1 | 5/2014 | Liu et al. | |
| 8,810,961 B2 | 8/2014 | Taguchi et al. | |
| 9,082,433 B1 | 7/2015 | Tang et al. | |
| 9,299,367 B1 | 3/2016 | Tang et al. | |
| 9,443,541 B1 | 9/2016 | Liu et al. | |
| 9,536,548 B1 | 1/2017 | Narayana | |
| 9,653,101 B1* | 5/2017 | Liu et al. | G11B 5/235 |
| 10,181,334 B1 | 1/2019 | Song et al. | |
| 10,276,193 B2 | 4/2019 | Narita et al. | |
| 10,325,618 B1* | 6/2019 | Wu et al. | G11B 5/1278 |
| 10,593,355 B1 | 3/2020 | Basu et al. | |
| 10,714,132 B1 | 7/2020 | Chen et al. | |
| 10,741,202 B2 | 8/2020 | Ho et al. | |
| 10,777,219 B1 | 9/2020 | Asif Bashir et al. | |
| 10,789,977 B1 | 9/2020 | Song et al. | |
| 10,839,828 B2 | 11/2020 | Le et al. | |
| 10,839,844 B1 | 11/2020 | Asif Bashir et al. | |
| 10,867,626 B1 | 12/2020 | Li et al. | |
| 10,957,348 B2 | 3/2021 | Bai et al. | |
| 11,043,232 B1* | 6/2021 | Wu | G11B 5/3146 |
| 11,152,021 B1* | 10/2021 | Liu et al. | G11B 5/1278 |
| 11,276,422 B2 | 3/2022 | Le et al. | |
| 11,295,766 B2 | 4/2022 | Takagishi et al. | |
| 11,508,401 B1 | 11/2022 | Asif Bashir et al. | |
| 11,557,314 B1 | 1/2023 | Asif Bashir et al. | |
| 11,631,423 B2 | 4/2023 | Nakagawa et al. | |
| 11,636,874 B1* | 4/2023 | Tang | G11B 5/3146 360/313 |
| 11,854,584 B1* | 12/2023 | Asif Bashir et al. | G11B 5/314 |
| 11,875,825 B1* | 1/2024 | Liu | G11B 5/315 |
| 11,881,237 B1 | 1/2024 | Asif Bashir et al. | |
| 11,894,026 B1 | 2/2024 | Goncharov et al. | |
| 11,900,971 B1 | 2/2024 | Goncharov et al. | |
| 12,057,146 B1 | 8/2024 | Shi et al. | |
| 2005/0280935 A1 | 12/2005 | Clinton et al. | |
| 2007/0263324 A1 | 11/2007 | Allen et al. | |
| 2012/0092787 A1* | 4/2012 | Koizumi | G11B 5/1278 360/123.01 |
| 2015/0043106 A1* | 2/2015 | Yamada et al. | G11B 5/1278 360/123.05 |
| 2022/0093123 A1* | 3/2022 | Liu et al. | G11B 5/314 |
| 2022/0238135 A1 | 7/2022 | Bai et al. | |
| 2023/0062839 A1* | 3/2023 | Nakagawa et al. | G11B 5/235 |
| 2023/0125878 A1* | 4/2023 | Tang | G11B 5/315 |
| 2024/0062776 A1* | 2/2024 | Kimura | G11B 5/1278 |
| 2024/0105219 A1* | 3/2024 | Koizumi | G11B 5/1278 |
| 2024/0355353 A1 | 10/2024 | Asif Bashir et al. | |

OTHER PUBLICATIONS

T. Taguchi, K. Shimomura, A. Takeo, Stepped side shield writer for perpendicular recording, Journal of Magnetism and Magnetic Materials, vol. 320, Issue 22, 2008.

* cited by examiner

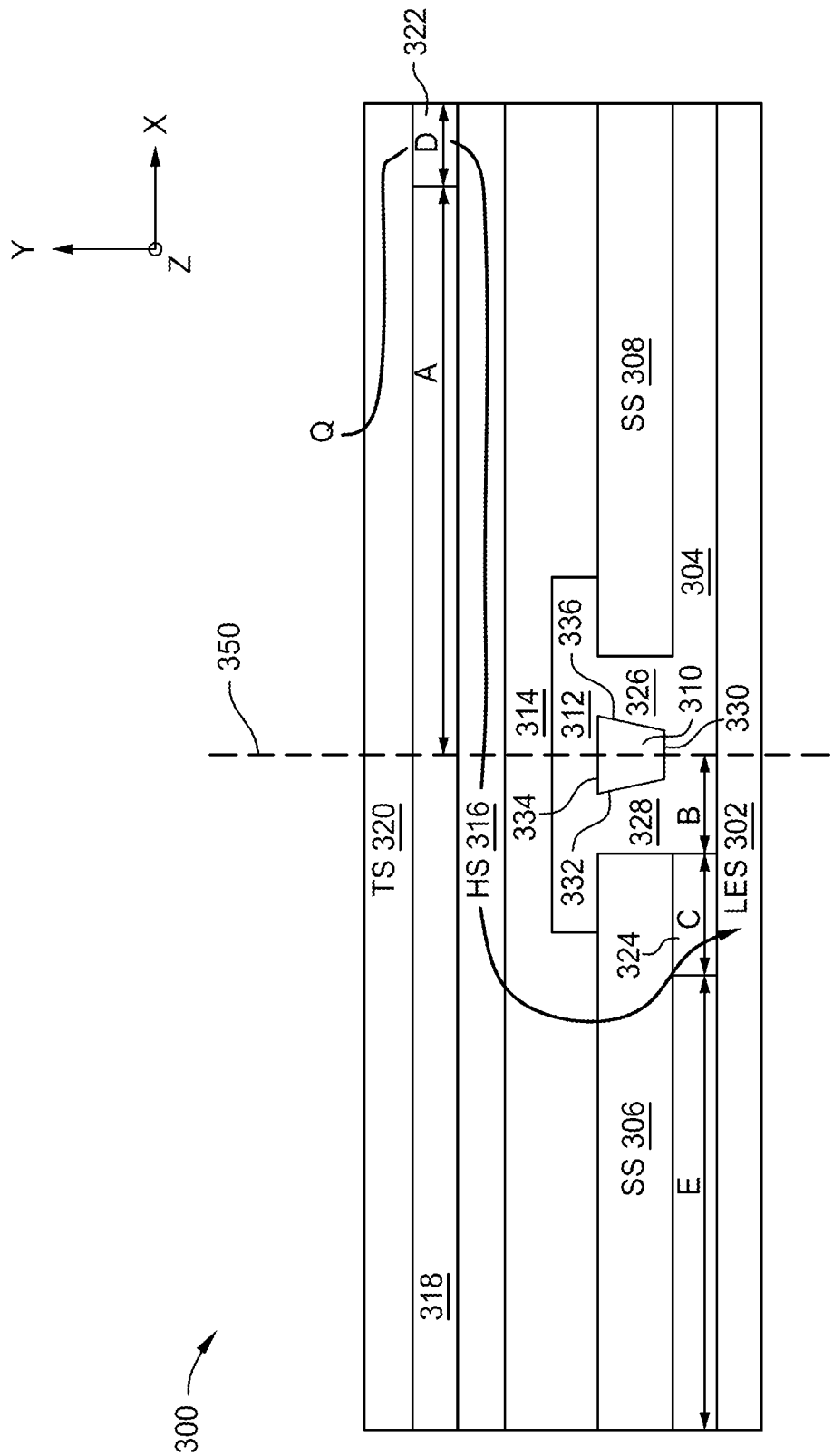

MAGNETIC RECORDING HEAD WITH CURRENT PATH BETWEEN TRAILING SHIELD AND LEADING SHIELD FOR IMPROVED RESISTANCE

CROSS-REFERENCE TO RELATED APPLICATIONS

This application claims benefit of U.S. Provisional Patent Application Ser. No. 63/496,770, filed Apr. 18, 2023, which is herein incorporated by reference.

BACKGROUND OF THE DISCLOSURE

Field of the Disclosure

Embodiments of the present disclosure generally relate to a magnetic recording head for magnetic media, such as a magnetic media drive or magnetic disk drive.

Description of the Related Art

At the heart of a computer is a magnetic disk drive. Information is written to and read from a disk as the disk rotates past read and write heads that are positioned very closely to the magnetic surface of the disk. Over the past few years, various magnetic recording methods have been studied to improve the areal density of a magnetic media device, such as a hard disk drive (HDD).

Magnetic recording heads, or write heads, in HDDs can have a significant effect on the overall performance and reliability of the recording device. Magnetic recording heads may be designed to achieve specific advantages, such as improved performance or higher recording density. Various approaches of energy assisted magnetic recording have proposed injection of energy to increase density. For example, in Microwave Assisted Magnetic Recording (MAMR), an assistive AC field is directed toward a media to lower its coercivity to enable higher areal density.

SUMMARY OF THE DISCLOSURE

The present disclosure generally relates to a magnetic recording head for magnetic media, such as a magnetic media drive. The head has a main pole, trailing shield, leading shield, first side shield, and second side shield. One side shield is electrically connected to the trailing shield and electrically disconnected from the leading shield. The other side shield is electrically connected to the leading shield and electrically disconnected from the trailing shield. The side shields are electrically connected through a hot seed layer and/or a nonmagnetic electrically conductive layer that is electrically disconnected from the main pole. Such an arrangement results in a current path from the trailing shield, through the side shields, around the main pole, and to the leading shield, which results in reduced resistance.

In one embodiment, a magnetic recording head comprises: a leading shield; a main pole spaced from the leading shield by insulating material, wherein the main pole includes a first side facing the leading shield, a second side opposite the first side, a third side connecting the first side and the second side, and a fourth side opposite the third side; a hot seed layer spaced from the second side of the main pole by insulating material; a trailing shield; a first side shield spaced from the third side of the main pole and coupled to the trailing shield; and a second side shield spaced from the fourth side of the main pole and coupled to the leading shield.

In another embodiment, a magnetic recording head comprises: a leading shield; a main pole spaced from the leading shield by insulating material, wherein the main pole includes a first side facing the leading shield, a second side opposite the first side, a third side connecting the first side and the second side, and a fourth side opposite the third side; a hot seed layer spaced from the second side of the main pole by insulating material; a trailing shield; a first side shield spaced from the fourth side of the main pole and coupled to the leading shield; and a second side shield spaced from the third side of the main pole and coupled to the trailing shield.

In another embodiment, a magnetic recording head comprises: a leading shield; a main pole spaced from the leading shield by insulating material; a trailing shield spaced from the main pole by insulating material; a first side shield spaced from the main pole by insulating material; a second side shield spaced from the main pole by insulating material; and means to provide a current path from the trailing shield to the leading shield through the first side shield and the second side shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3G are schematic illustrations of a magnetic recording head as viewed from a media facing surface (MFS) according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
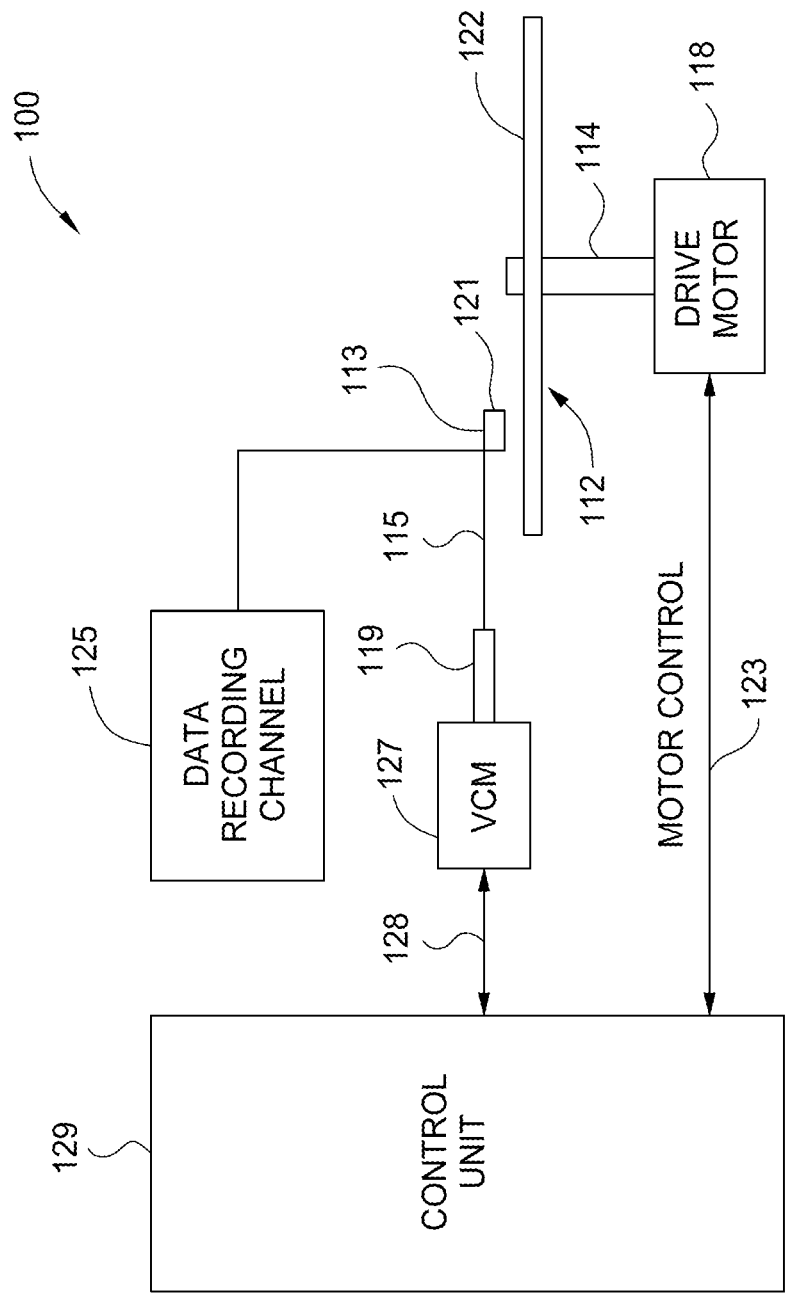
FIG. 1 illustrates a disk drive embodying this disclosure.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Various forms of energy assisted magnetic recording have involved creating a current path through a stack structure around the main pole in order to enhance the recording field to achieve a higher recording density. For example, in MAMR, a spin torque oscillator (STO) is usually located between a main pole and a shield (e.g., leading or trailing shield), and a current path is electrically provided from the main pole through the STO and to the shield, or vice versa. In other similar approaches, instead of an STO, a material stack containing a spin torque layer that switches against the main pole's gap field, or a conductive stack, is similarly placed between the main pole and the shield, and the electrically leads in the leading or trailing shields create a current path to provide the assistive effect when the current flows through the stack.

Another assistive recording approach is described in co-pending U.S. application Ser. No. 17/183,161, filed on Feb. 23, 2021, titled "Magnetic Recording Devices Having External Alternating Current Sources," the disclosure of which is hereby incorporated. The application discloses embodiments that utilize side shields as part of a current path rather than the aforementioned current path through trailing shield and/or leading shield. Using side shields as part of the current path could result in higher resistance and side shield protrusion. Additionally, using side shields as part of the current path can be challenging for thickness control as well as lead connection to the side shields.

The present disclosure generally relates to a magnetic recording head for magnetic media, such as a magnetic media drive. The head has a main pole, trailing shield, leading shield, first side shield, and second side shield. One side shield is electrically connected to the trailing shield and electrically disconnected from the leading shield. The other side shield is electrically connected to the leading shield and electrically disconnected from the trailing shield. The side shields are electrically connected through a hot seed layer and/or a nonmagnetic electrically conductive layer that is electrically disconnected from the main pole. Such an arrangement results in a current path from the trailing shield, through the side shields, around the main pole, and to the leading shield, which results in reduced resistance.

Generally speaking, reduced resistance is achieved compared to what would otherwise occur when the current travels through the side shields to have the current flow in the cross track direction in order to achieve the magnetic field in the down track direction. Here, the trailing shield (or leading shield) is a lead for the current to flow through to the leading shield (or trailing shield). During the course of the flow, the current travels around the main pole. Using the trailing shield and the leading shield reduces resistance because trailing shield and the leading shield have a large surface area to function as leads and drive the current around the main pole.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
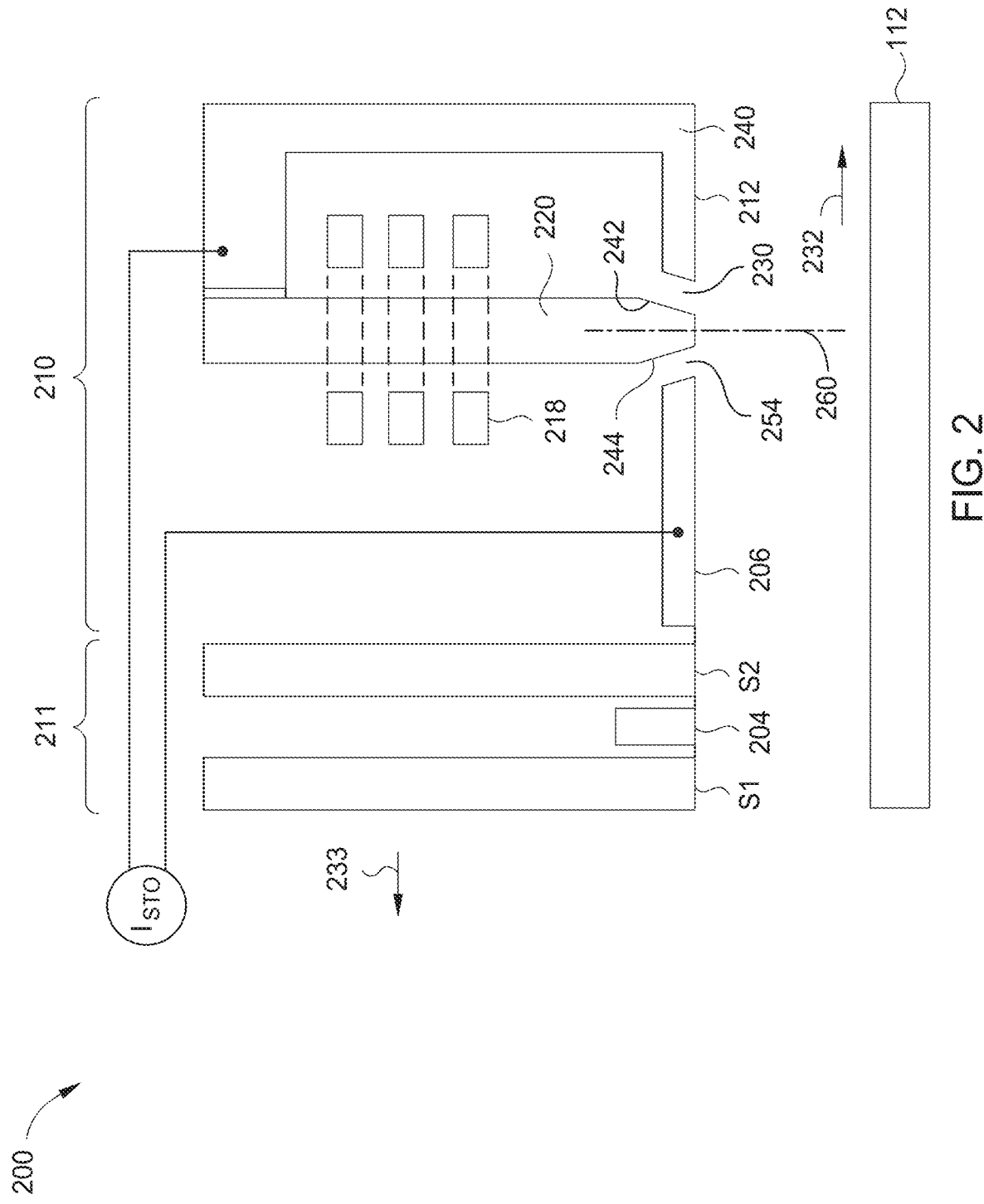
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2.

The sensing element 204 is a magnetoresistive (MR) sensing element, such an element exerting a tunneling magnetoresistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a trailing gap 230 disposed between the main pole 220 and the TS 240. Each of the main pole 220, the leading shield 206, and the TS 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254. The TS 240 is spaced from the main pole 220 by a trailing gap.

Figure 3A:
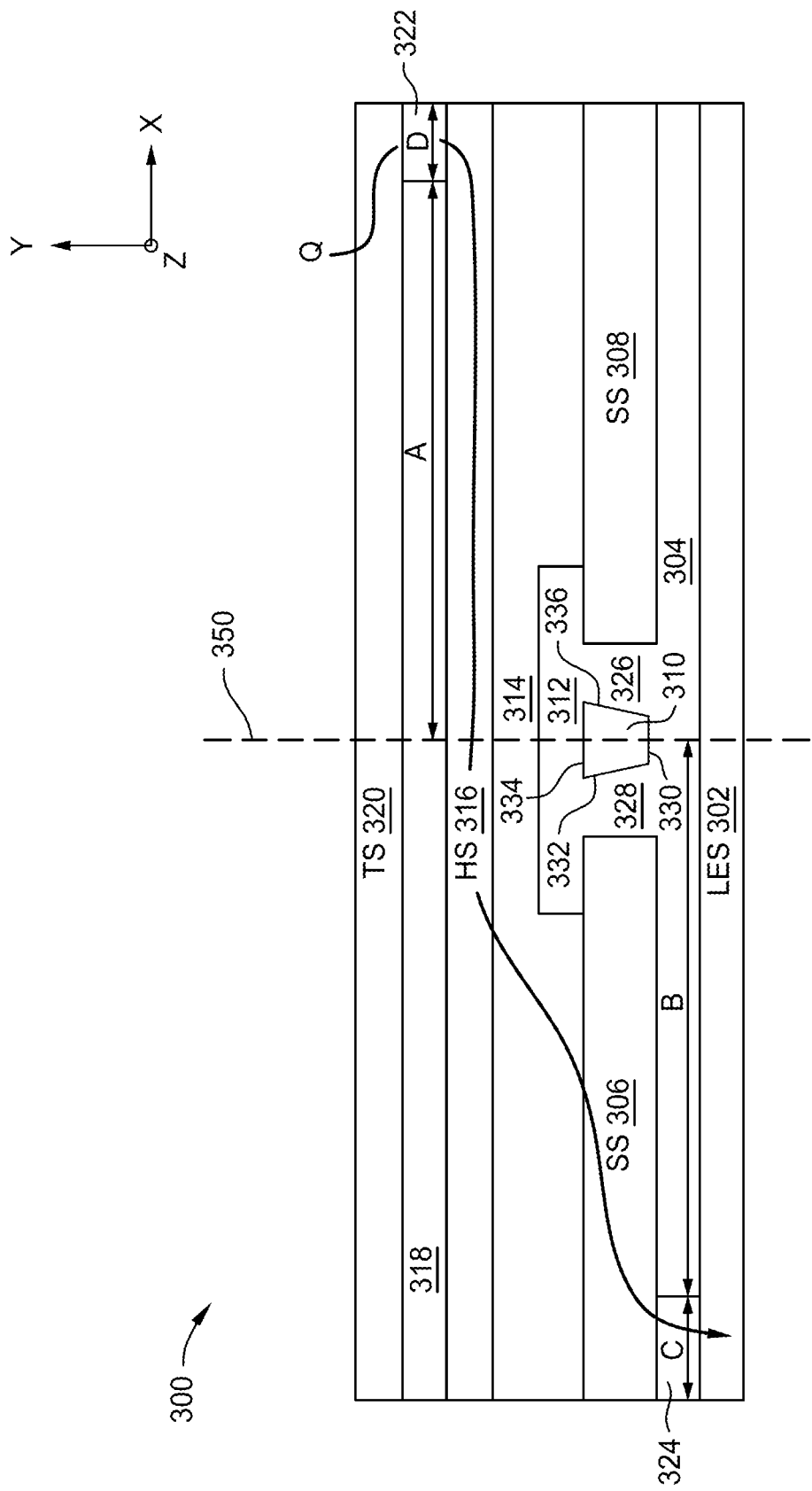

FIGS. 3A-3G are schematic illustrations of a magnetic recording head as viewed from a MFS according to various embodiments. In the figures, the "X" direction is a cross-track direction for the head, while the "Y" direction is the down-track direction and the "Z" direction is the stripe height direction from the MFS. As shown in FIG. 3A, the magnetic recording head 300 includes a leading shield 302, oftentimes referred to as a leading edge shield or LES. The leading shield 302 has a thickness in the "Y" direction of between about 500 and about 1500 nm. Suitable materials for the leading shield include a magnetic material, such as a NiFe alloy or FeCo.

Adjacent the leading shield 302, in the "Y" direction, is an insulating layer 304. The insulating layer 304 is utilized to electrically and magnetically isolate the main pole 310 from the leading shield 302. The insulating layer 304 has a thickness in the "Y" direction of about 5 nm and about 20 nm. Suitable materials for the insulating layer 304 include oxides and nitrides such as aluminum oxide, silicon oxide, silicon nitride, silicon oxynitride, magnesium oxide, and combinations thereof.

Adjacent the insulating layer 304 are the side shields 306, 308. The side shields 306, 308, oftentimes referred to as SS, have a thickness in the "Y" direction of about 50 nm and about 150 nm. Suitable materials for the side shields 306, 308 include NiFe, CoFe, NiFeCo, CoFeHf, CoFeCr, and combinations thereof. The side shields 306, 308 are electrically and magnetically isolated from the main pole 310 by insulating material 326, 328. Suitable materials for the insulating material 326, 328 include oxides and nitrides such as silicon oxide, silicon nitride, silicon oxynitride, magnesium oxide, and combinations thereof.

Adjacent the insulating layer 304, and between the side shields 306, 308, is the main pole 310. The main pole 310 has a first side 330 facing the insulating layer 304 and leading shield 302. The main pole 310 has a second side 334 opposite the first side 330. The main pole 310 also has a third side 332 facing the side shield 306 and connecting the first side 330 to the second side 334. Finally, the main pole 310 has a fourth side 336 opposite the third side 332, facing the side shield 308, and connecting the first side 330 and the second side 334. In one embodiment, the first side 330 can be a point such that the third side 332 and fourth side 336 connect at a location (e.g., the point) facing the insulating layer 304 and leading shield 302. The main pole 310 has a thickness in the "Y" direction of about 50 nm and about 100 nm. Suitable materials for the main pole 310 include CoFe, CoFeNi, or FeNi, other suitable magnetic materials, and combinations thereof.

Adjacent the main pole 310 is an insulating layer 312. The insulating layer 312 is utilized to electrically isolate the main pole 310 from the nonmagnetic, electrically conductive layer 314. The insulating layer 312 has a thickness in the "Y" direction of about 1 nm and about 6 nm. Suitable materials for the insulating layer 312 include oxides and nitrides such as aluminum oxide, silicon oxide, silicon nitride, silicon oxynitride, magnesium oxide, and combinations thereof.

Adjacent the insulating layer 312 is a nonmagnetic, electrically conductive layer 314. The nonmagnetic, electrically conductive layer 314 has a thickness in the "Y" direction of about 10 nm and about 20 nm. Suitable materials for the nonmagnetic, electrically conductive layer 314 include ruthenium, gold, silver, copper and combinations thereof.

Adjacent the nonmagnetic, electrically conductive layer 314 is a hot seed layer 316, oftentimes referred to as HS. The hot seed layer 316 can include a high moment sputter material, such as CoFe, CoFeNi, NiFe. The hot seed layer 316 has a thickness of between about 50 and about 100 nm in the "Y" direction.

Adjacent the hot seed layer 316 is an insulating layer 318. The insulating layer 318 is utilized to electrically and magnetically isolate the hot seed layer 316 from the trailing shield 320. The insulating layer 318 has a thickness in the "Y" direction of about 1 nm and about 20 nm. Suitable materials for the insulating layer 318 include oxides and nitrides such as aluminum oxide, silicon oxide, silicon nitride, silicon oxynitride, magnesium oxide, and combinations thereof.

Adjacent the insulating layer 318 is the trailing shield 320, oftentimes referred to as TS. The trailing shield 320 comprises a magnetic material, such as NiFe, or other suitable magnetic materials and has a thickness in the "Y" direction of between about 100 nm and about 1000 nm.

As noted above, there is a desire to provide a current path through the side shields 306, 308 and around the main pole 310. Rather than simply coupling the side shields 306, 308 to leads and incur the issues mentioned above, a different current path is considered. In order to create the current path, the side shields 306, 308 are electrically coupled to the leading shield 302 and trailing shield 320. One of the side shields 306 is electrically coupled to the leading shield 302 through a connector 324 while the other side shield 308 is electrically coupled to the trailing shield 320 through a connector 322. Both side shields 306, 308 are electrically connected to the nonmagnetic, electrically conductive layer 314 and the hot seed layer 316. The connectors 322, 324 may comprise magnetic material, similar to LS or SS materials and have a thickness in the "Y" direction of between about 5 and about 20 nm.

With such connections, a current applied at the trailing shield 320 travels along a path "Q" through the connector 322 to the hot seed layer 316 and nonmagnetic, electrically conductive layer 314, and side shield 308 at the fourth side 336. The current flows through the nonmagnetic, electrically conductive layer 314 and hot seed layer 316 around the main pole 310 at the second side 334 to the side shield 306 at the third side 332. The current then flows from the side shield 306 through the connector 324 to the leading shield 302. It is to be understood that the current can flow in the opposite direction from the leading shield 302 to the trailing shield 320 through the same described path. The current path around the main pole concentrates current near the main pole 310 for a higher magnetic field provided to the media. Various dimensional ranges identified as "A", "B", "C", "D", "E", and "F" are used throughout FIGS. 3A-3G. It is to be understood that the dimensional ranges indicated for "A", "B", "C", "D", "E", and "F", once indicated in the description below, are applicable for each of FIGS. 3A-3G.

As shown in FIG. 3A, the connector 322 is spaced a distance "A" from a centerline 350 that extends in the "Y" direction through the center of the main pole 310. In one embodiment, the connector 322 is spaced the distance "A" of between about 100 nm and about 1,000 nm from the centerline 350. The connector has a width "D" in the "X" direction of between about 1 um and about 20 um. Similarly, the connector 324 is spaced a distance "B" of between about 100 nm and about 1,000 nm from the centerline 350. The connector has a width "C" in the "X" direction of between about 1 um and about 20 um. In the embodiment shown in FIG. 3A, the connectors 322, 324 are spaced an equal distance from the centerline 350 and have the same width.

While connector 322 is electrically coupled between the side shield 308 (via the hot seed layer 316 and nonmagnetic, electrically conductive layer 314) and the trailing shield 320 on one side of the centerline 350, the side shield 308 is electrically spaced from the leading shield 302 on the same side of the centerline 350. It is to be understood that while the side shield 308 is ultimately electrically coupled to the leading shield 302 (as the side shield 308 is part of the current path described above), the electrical coupling occurs on the other side of the centerline 350. Hence, it can be said that on the side of the centerline 350 where the connector 322 is disposed, the side shield 308 is both electrically connected to the trailing shield 320 and electrically isolated from the leading shield 302.

Similarly, connector 324 is electrically coupled between the side shield 306 and the leading shield 302 on one side of the centerline 350, the side shield 306 is electrically spaced from the trailing shield 320 on the same side of the centerline 350. It is to be understood that while the side shield 306 is ultimately electrically coupled to the trailing shield 320 (as the side shield 306 is part of the current path described above), the electrical coupling occurs on the other side of the centerline 350. Hence, it can be said that on the side of the centerline 350 where the connector 324 is disposed, the side shield 306 is both electrically isolated from the trailing shield 320 and electrically connected to the leading shield 302.

It is to be understood that in FIG. 3A-3G, the connectors 322, 324 are shown on a particular side of the centerline 350. Connector 322, for example, is disposed on the same side of the centerline 350 as the fourth side 336 of the main pole 310. Similarly, connector 324 is disposed on the same side of the centerline 350 as the third side 332 of the main pole 310. However, it is to be understood that the opposite orientation is contemplated. Specifically, connector 322 may be disposed on the same side of the centerline 350 as the third side 332 of the main pole 310 while the connector 324 may be disposed on the same side of the centerline 350 as the fourth side 336 of the main pole 310. However, it is to be noted that the connectors 322, 324 are not disposed on the same side of the centerline 350.

The connectors 322, 324 do not need to be spaced equally from the centerline 350 or even have the same width. FIGS. 3B-3G illustrate embodiments where the widths may be different or the connectors 322, 324 are spaced different distances from the centerline 350.

Figure 3B:
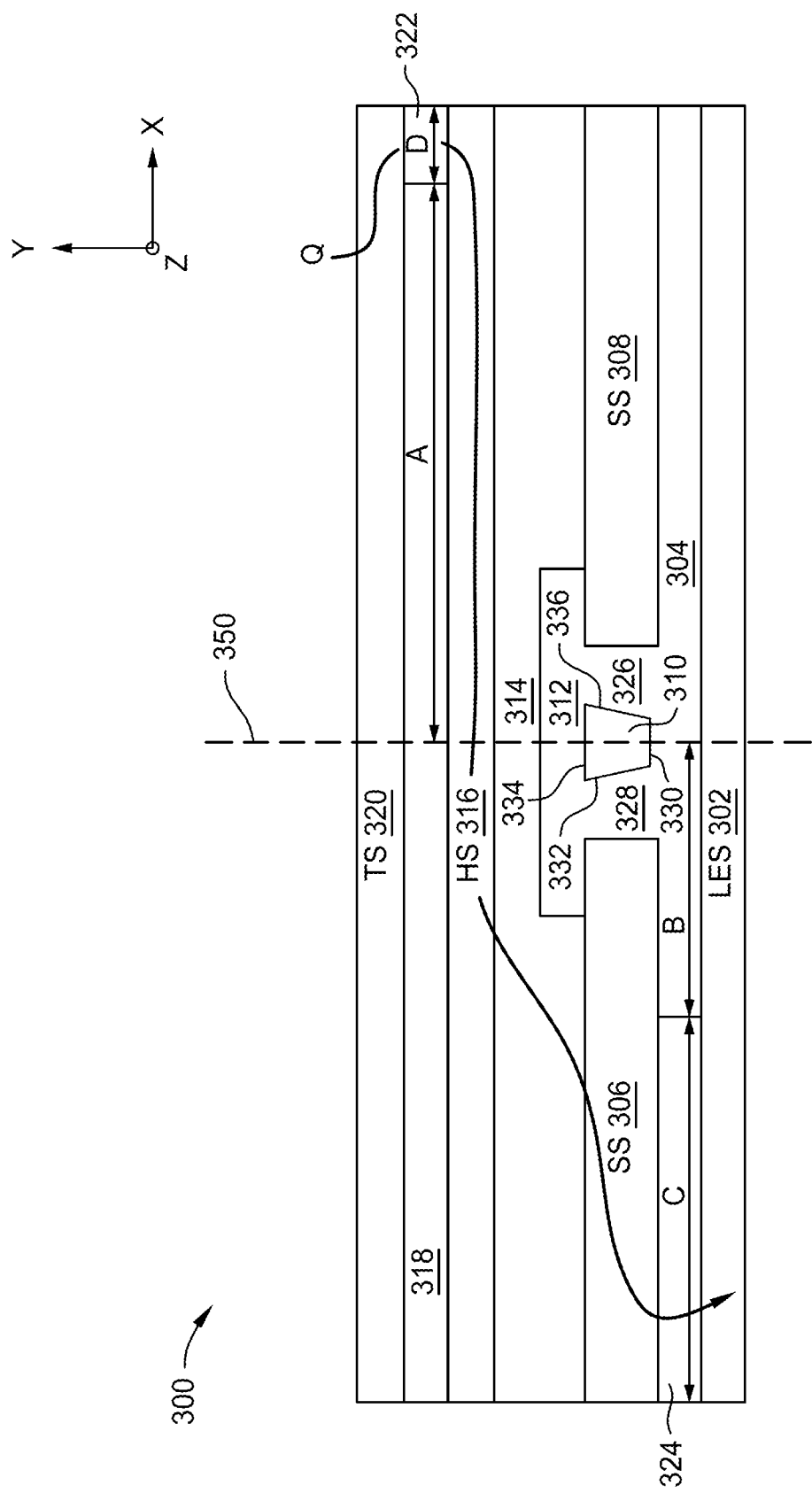
Figure 3C:
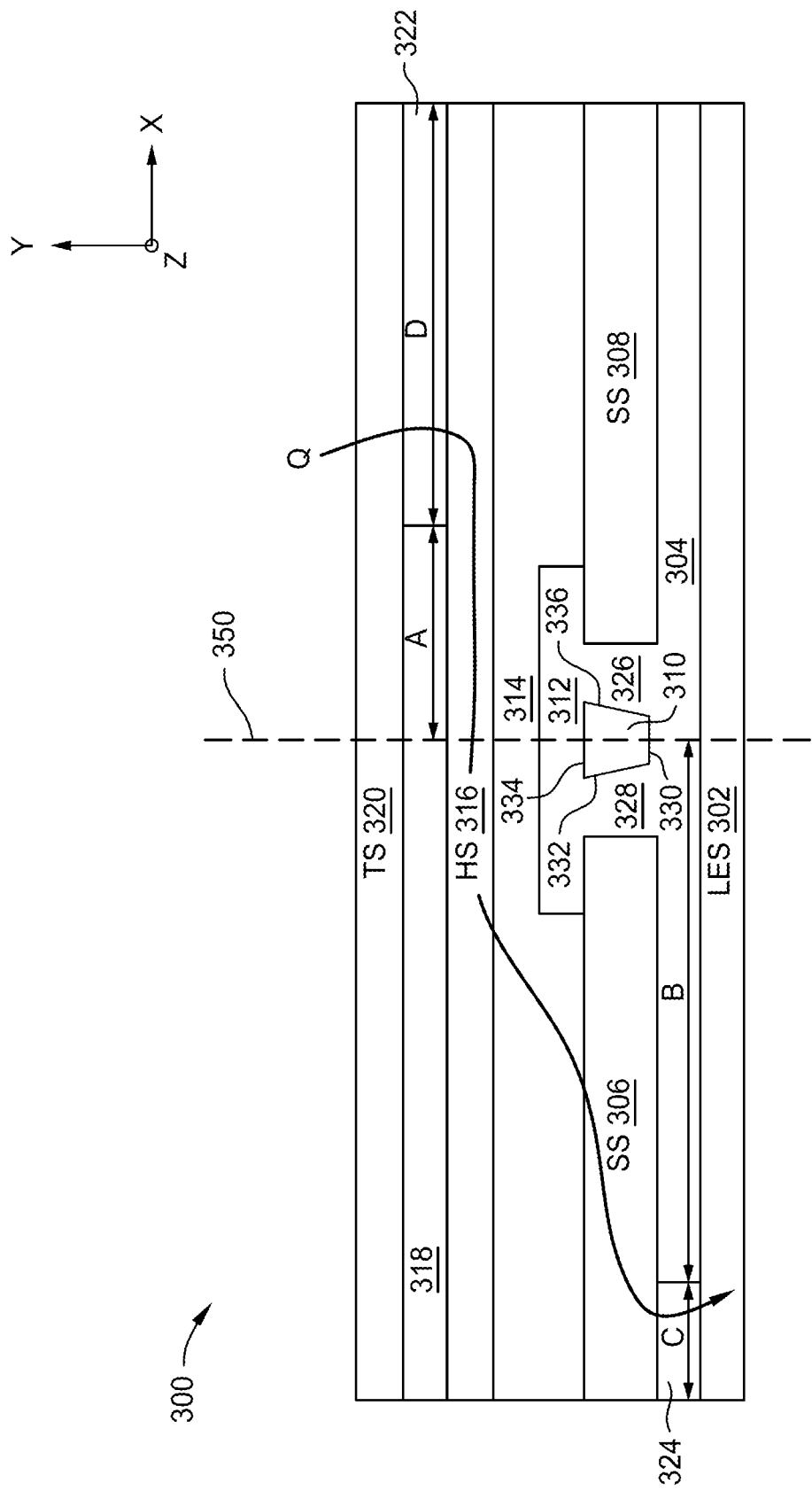

In FIG. 3B, connector 324 has a greater width than connector 322 and is disposed closer to the centerline 350 than connector 322. FIG. 3C is the opposite of FIG. 3B and as such, connector 322 has a greater width than connector 324 and is disposed closer to the centerline 350 than connector 324.

Figure 3D:
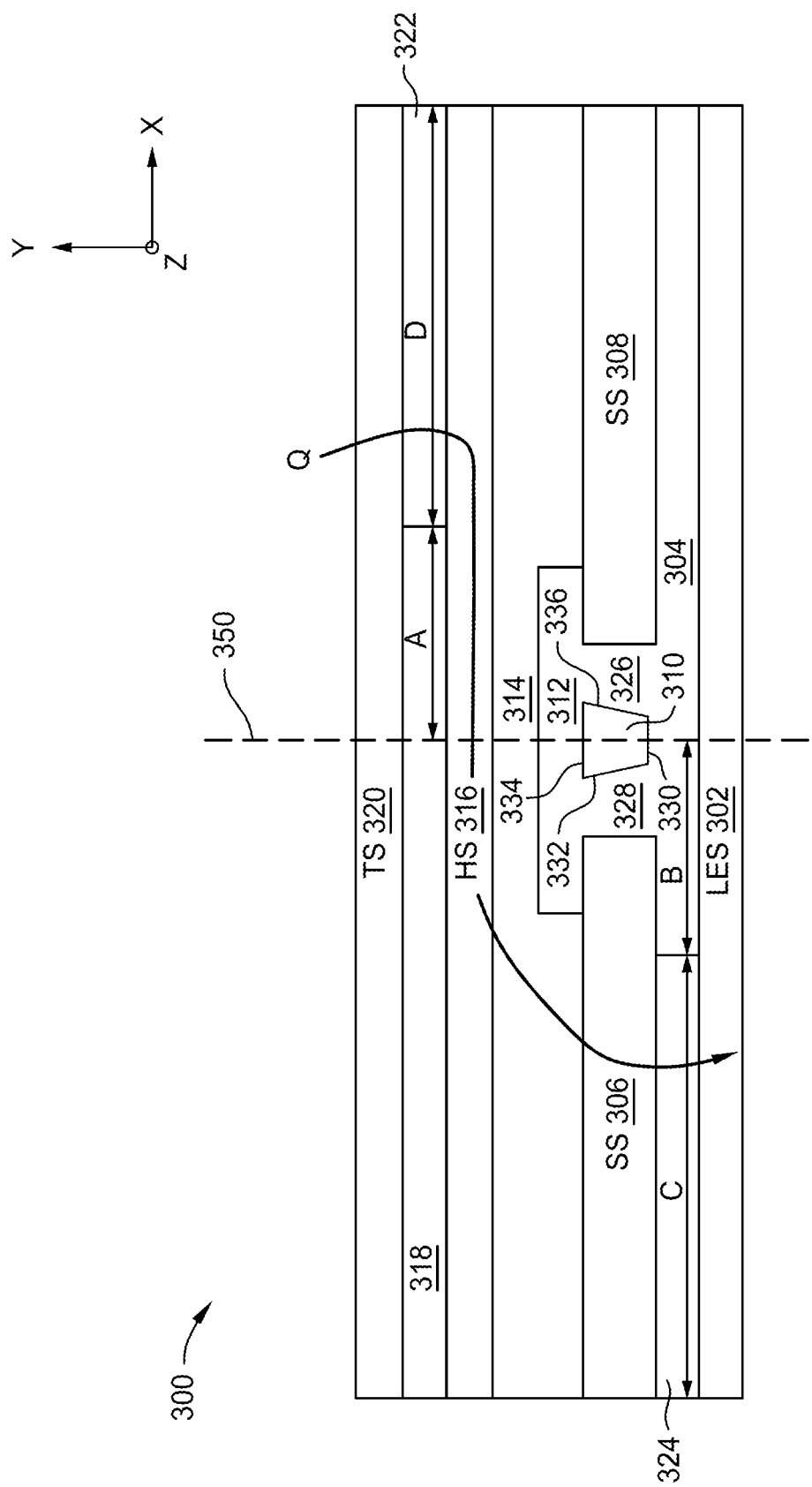
Figure 3F:
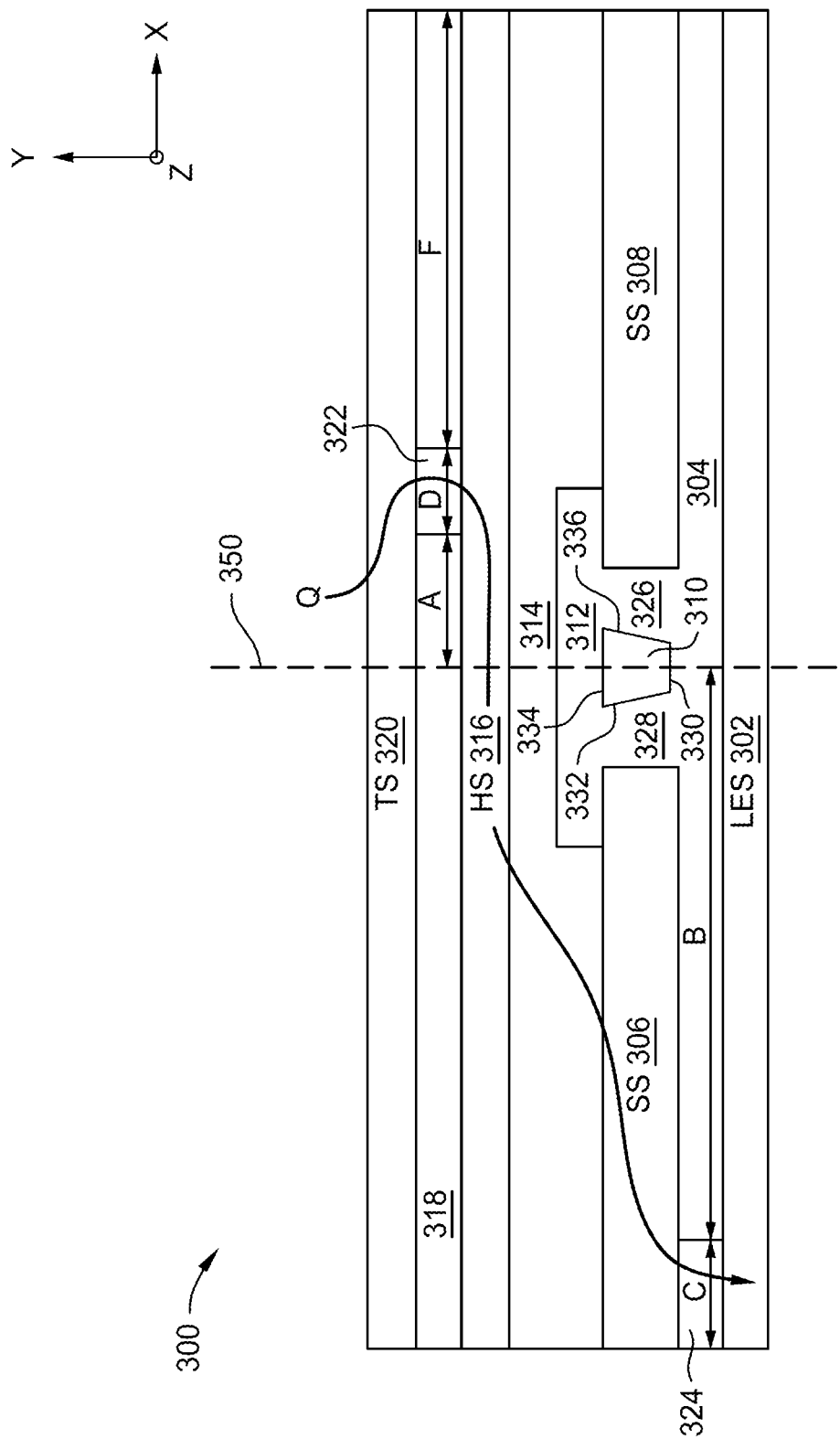
Figure 3G:
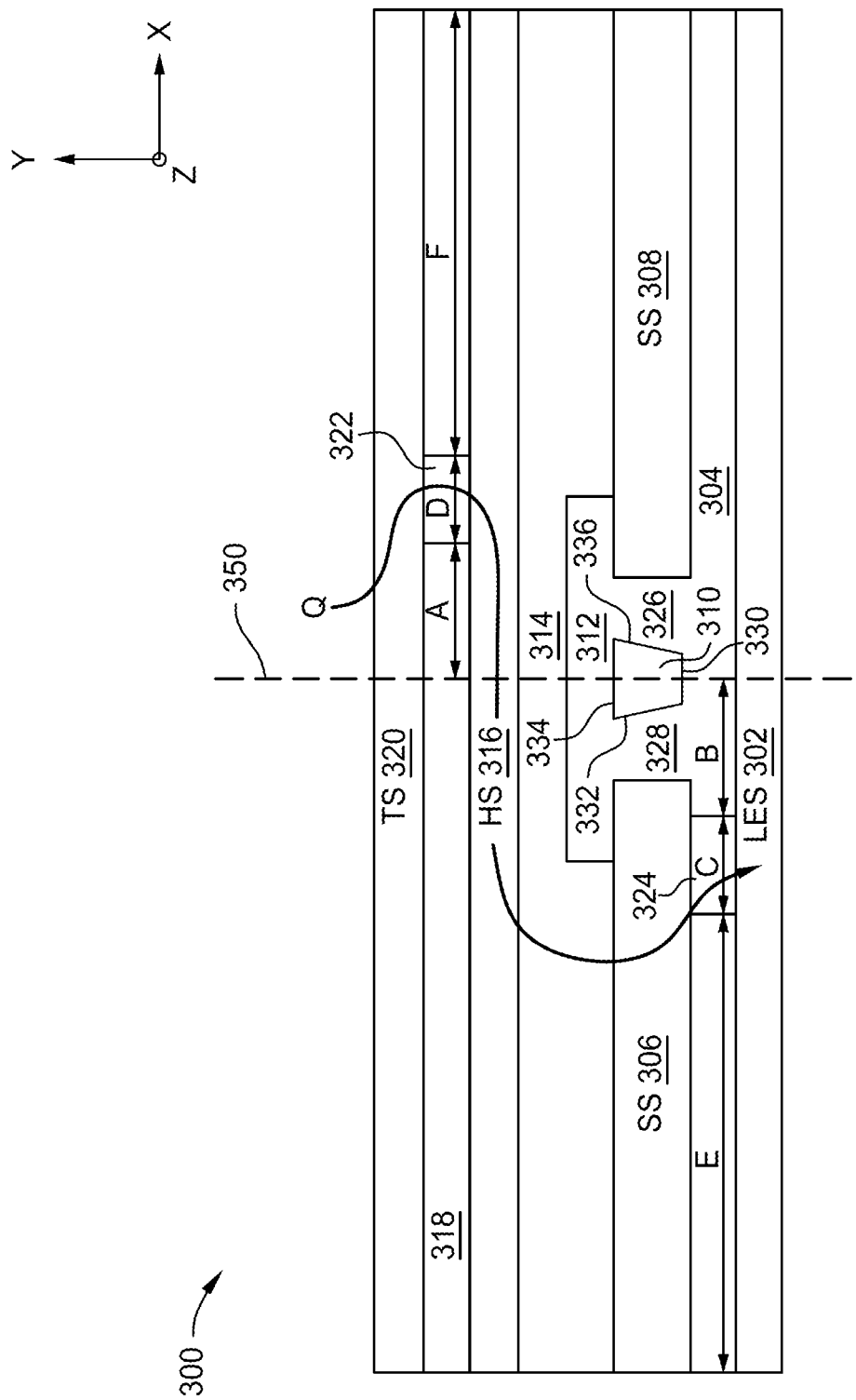

In FIG. 3D, connectors 322, 324 are closer to the centerline 350 than in FIG. 3A, and the connectors 322, 324 have a greater width than in FIG. 3A. In FIGS. 3E and 3F, the connectors 322, 324 have different widths, but have substantially identical spacing from the centerline 350. More specifically, in FIG. 3E, connector 324 has a smaller width than connector 322 and as such, connector 324 has insulating material further away from the centerline 350 having a width "E" of between about 10 nm and about 100 nm. Conversely, in FIG. 3F, connector 322 has a smaller width than connector 324 and as such, connector 322 has insulating material further away from the centerline 350 having a width "F" of between about 10 nm and about 100 nm. FIG. 3G is akin to a combination of FIGS. 3E and 3F where both connectors 322, 324 are spaced substantially the same distance from the centerline 350 and have substantially the same width, and additionally have insulating material further away from the centerline 350.

Thus, as shown in FIGS. 3A-3G, there are numerous arrangements possible for the connectors 322, 324 to enable creation of a current path between the leading shield 302 and the trailing shield 320 through the side shields 306, 308 around the main pole 310. One side shield 306, 308 can be electrically coupled to the leading shield 302 on one side of the centerline 350 and electrically decoupled from the trailing shield 320 on the same side of the centerline 350. At the same time, the other side shield 306, 308 can be electrically coupled to the trailing shield 320 on the other side of the centerline 350 and electrically decoupled from the leading shield on the same side of the centerline 350. The current follows a path between the leading shield 302, connector 324, side shield 306, nonmagnetic electrically conductive layer 314, hot seed layer 316, side shield 308, connector 322, and trailing shield 320. Within those parameters, the connectors 322, 324 can have substantially identical widths (or different widths) and be spaced substantially identical distances (or different distances) from the centerline 350.

The distance that the connectors 322, 324 are spaced from the centerline 350 impacts how the current will look on top of the main pole 310. Thus, the larger the distance that the connectors 322, 324 are spaced from the centerline 350, more that the current will flow in the cross track direction on top of the main pole 310 or in the hot seed layer 316. If the distance is sufficiently wide, the resistance will be reduced. If the material of the connectors 322, 324 were non-magnetic, the resistance would be nice and low, but would be problematic from a magnetic point of view. Hence, the connectors 322, 324 are magnetic and spaced a sufficient distance from the centerline 350 to achieve both low resistivity and current flowing in the cross track direction above the main pole 310. Of course, the wider the connector 322, 324, the closer the connector 322, 324 is to the centerline 350 and hence, the greater the impact upon the current flow in the cross track direction. The thinner the connector 322, 324, the more flexibility in placement of the connector 322, 324 away from the centerline 350.

Figure 4:
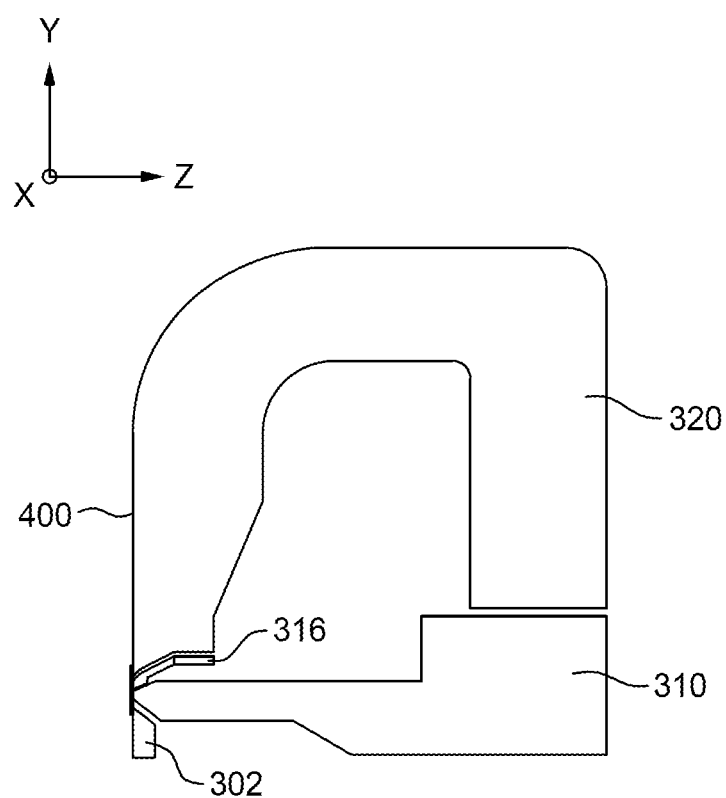
FIG. 4 is a schematic cross-sectional illustration of a magnetic recording head according to one embodiment.

FIG. 4 is a schematic cross-sectional illustration of a magnetic recording head 400 according to one embodiment. FIG. 4 illustrates the leading shield 302, trailing shield 320, main pole 310, and hot seed layer 316, but it is to be understood that other layers are present. In particular, the hot seed layer 316 is shown to extend in the "Z" direction a distance referred to as the throat height. The throat height can have a length of between about 250 nm and about 500 nm.

By providing a current path through not only the trailing and leading shields, but also the side shields, a direct current path exists through the trailing shield, through the side shields around the main pole, and finally through the leading shield, or vice versa. One side shield is connected to the trailing shield while being disconnected from the leading shield while the other side shield is connected to the leading shield and disconnected from the trailing shield. Such an arrangement cuts resistance in half compared to direct lead connection to the side shields and results in a similar current flow on top of the main pole which thus results in a higher field in the magnetic media. Additionally, the side shield thickness does not need to be adjusted to accommodate lead connections as the lead connection is to the leading shield and the trailing shield, which already, traditionally, may have a lead connection.

In one embodiment, a magnetic recording head comprises: a leading shield; a main pole spaced from the leading shield by insulating material, wherein the main pole includes a first side facing the leading shield, a second side opposite the first side, a third side connecting the first side and the second side, and a fourth side opposite the third side; a hot seed layer spaced from the second side of the main pole by insulating material; a trailing shield; a first side shield spaced from the third side of the main pole and coupled to the trailing shield; and a second side shield spaced from the fourth side of the main pole and coupled to the leading shield. The magnetic recording head further comprises a hot seed layer disposed between the trailing shield and the main pole. The hot seed layer is spaced from the main pole by an insulating material. The hot seed layer is electrically coupled to the first side shield and the second side shield. The first side shield is coupled to the trailing shield at a first location spaced a first distance from the main pole, wherein the second side shield is coupled to the leading shield at a second location spaced a second distance from the main pole, and wherein the first distance is greater than the second distance. The first side shield is coupled to the trailing shield at a first location having a first length, wherein the second side shield is coupled to the leading shield at a second location having a second length, and wherein the first length is less than the second length. A magnetic recording device comprising the magnetic recording head is also contemplated.

In another embodiment, a magnetic recording head comprises: a leading shield; a main pole spaced from the leading shield by insulating material, wherein the main pole includes a first side facing the leading shield, a second side opposite the first side, a third side connecting the first side and the second side, and a fourth side opposite the third side; a hot seed layer spaced from the second side of the main pole by insulating material; a trailing shield; a first side shield spaced from the fourth side of the main pole and coupled to the leading shield; and a second side shield spaced from the third side of the main pole and coupled to the trailing shield. The magnetic recording head further comprises a nonmagnetic electrically conductive layer disposed between the hot seed layer and the second side of the main pole. The nonmagnetic electrically conductive layer is coupled to the first side shield and the second side shield. The first side shield is electrically insulated from the trailing shield. The second side shield is electrically insulated from the leading shield. The hot seed layer has a throat height of between about 250 nm and about 500 nm. A magnetic recording device comprising the magnetic recording head is also contemplated.

In another embodiment, a magnetic recording head comprises: a leading shield; a main pole spaced from the leading shield by insulating material; a trailing shield spaced from the main pole by insulating material; a first side shield spaced from the main pole by insulating material; a second side shield spaced from the main pole by insulating material; and means to provide a current path from the trailing shield to the leading shield through the first side shield and the second side shield. The current path runs through a location disposed between the main pole and the trailing shield. The current path is electrically insulated from the main pole. The first side shield is coupled to the trailing shield at a first location that is spaced a further distance away from the main pole as compared to second location where the second side shield is coupled to the leading shield. The first location has a larger surface area at a media facing surface as compared to the second location. A magnetic recording device comprising the magnetic recording head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a leading shield;
a main pole spaced from the leading shield by insulating material, wherein the main pole includes a first side facing the leading shield, a second side opposite the first side, a third side connecting the first side and the second side, and a fourth side opposite the third side;
a trailing shield;
a hot seed layer disposed between the trailing shield and the main pole, wherein the hot seed layer is spaced from the trailing shield by a first insulating material;

a first side shield spaced from the third side of the main pole and electrically coupled to the trailing shield;

a second side shield spaced from the fourth side of the main pole and electrically coupled to the leading shield; and a conductive, nonmagnetic layer, between the main pole and the hot seed layer, that is electrically coupled to the first side shield and the second side shield.

2. The magnetic recording head of claim 1, wherein the hot seed layer is spaced from the second side of the main pole by the conductive, nonmagnetic layer and by a second insulating material.

3. The magnetic recording head of claim 2, wherein the hot seed layer is electrically coupled to the first side shield and the second side shield.

4. The magnetic recording head of claim 1, wherein the first side shield is electrically coupled to the trailing shield at a first location spaced a first distance from the main pole, wherein the second side shield is electrically coupled to the leading shield at a second location spaced a second distance from the main pole, and wherein the first distance is greater than the second distance.

5. The magnetic recording head of claim 1, wherein the first side shield is electrically coupled to the trailing shield at a first location having a first length, wherein the second side shield is electrically coupled to the leading shield at a second location having a second length, and wherein the first length is less than the second length.

6. A magnetic recording device comprising the magnetic recording head of claim 1.

7. A magnetic recording head, comprising:

a leading shield;

a main pole spaced from the leading shield by insulating material, wherein the main pole includes a first side facing the leading shield, a second side opposite the first side, a third side connecting the first side and the second side, and a fourth side opposite the third side;

a hot seed layer spaced from the second side of the main pole;

a trailing shield;

an insulating layer disposed between the hot seed layer and the trailing shield;

a first side shield spaced from the fourth side of the main pole and coupled to the leading shield;

a second side shield spaced from the third side of the main pole and coupled to the trailing shield; and a nonmagnetic electrically conductive layer disposed between the hot seed layer and the second side of the main pole, wherein the nonmagnetic electrically conductive layer is electrically coupled to the first side shield and the second side shield.

8. The magnetic recording head of claim 7, wherein the first side shield is electrically insulated from the trailing shield.

9. The magnetic recording head of claim 7, wherein the second side shield is electrically insulated from the leading shield.

10. The magnetic recording head of claim 7, wherein the hot seed layer has a throat height of between about 250 nm and about 500 nm.

11. The magnetic recording head of claim 7, further comprising a first connector disposed between the trailing shield and the hot seed layer, and a second connector disposed between the first side shield and the leading shield.

12. A magnetic recording device comprising the magnetic recording head of claim 7.

13. A magnetic recording head, comprising:

a leading shield;

a main pole spaced from the leading shield by insulating material;

a conductive nonmagnetic layer disposed over the main pole;

a hot seed layer disposed over the conductive nonmagnetic layer;

a trailing shield spaced from the main pole;

an insulating layer disposed between the hot seed layer and the trailing shield;

a first side shield spaced from the main pole by insulating material;

a second side shield spaced from the main pole by insulating material; and means to provide a current path from the trailing shield to the leading shield through the first side shield, the conductive nonmagnetic layer, and the hot seed layer.

14. The magnetic recording head of claim 13, wherein the current path is electrically insulated from the main pole.

15. The magnetic recording head of claim 13, wherein the first side shield is electrically coupled to the trailing shield at a first location that is spaced a further distance away from the main pole as compared to a second location where the second side shield is electrically coupled to the leading shield.

16. The magnetic recording head of claim 15, wherein the first location has a smaller surface area at a media facing surface as compared to the second location.

17. The magnetic recording head of claim 13, further comprising a first connector disposed between the trailing shield and the hot seed layer, and a second connector disposed between the first side shield and the leading shield.

18. A magnetic recording device comprising the magnetic recording head of claim 13.

* * * * *